US012628263B2

(12) United States Patent
Tully et al.

(10) Patent No.: US 12,628,263 B2
(45) Date of Patent: May 12, 2026

(54) MAGNETIC ORBITAL ANGULAR MOMENTUM BEAM ACCELERATION

(71) Applicant: The Trustees of Princeton University, Princeton, NJ (US)

(72) Inventors: Christopher George Tully, Princeton, NJ (US); Wonyong Chung, South Amboy, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 117 days.

(21) Appl. No.: 18/293,953

(22) PCT Filed: Aug. 2, 2022

(86) PCT No.: PCT/US2022/039157

§ 371 (c)(1),
(2) Date: Jan. 31, 2024

(87) PCT Pub. No.: WO2023/014707

PCT Pub. Date: Feb. 9, 2023

(65) Prior Publication Data

US 2025/0081325 A1 Mar. 6, 2025

Related U.S. Application Data

(60) Provisional application No. 63/228,463, filed on Aug. 2, 2021.

(51) Int. Cl.
*H05H 13/08* (2006.01)
*H05H 13/00* (2006.01)

(52) U.S. Cl.
CPC .......... *H05H 13/08* (2013.01); *H05H 13/005* (2013.01)

(58) Field of Classification Search
None
See application file for complete search history.

(56) References Cited

U.S. PATENT DOCUMENTS 4,246,067 A 1/1981 Linior
4,563,341 A * 1/1986 Flynn ........................ G21B 1/00 423/566.1

(Continued)

FOREIGN PATENT DOCUMENTS

CN 109860006 B * 11/2020 ............... H05H 7/22
CN 119653577 A * 3/2025 ............... H05H 7/22

(Continued)

OTHER PUBLICATIONS

International Search Report & Written Opinion for corresponding PCT Application No. PCT/US2022/039157, dated Dec. 6, 2022.

(Continued)

*Primary Examiner* — Srinivas Sathiraju
(74) *Attorney, Agent, or Firm* — MEAGHER, EMANUEL, LAKS GOLDBERG & LIAO, LLP

(57) ABSTRACT

A magnetic orbital angular momentum beam accelerator will accelerate charged particles, electrons or ions, from rest in zero or low magnetic field into a high magnetic field regions with high kinetic energies in the form of magnetic orbital angular momentum. For example, a beam injector that accelerates electrons or ions into 1T magnetic fields with tens of keV kinetic energies transverse to the magnetic fields can be used to heat magnetically confined plasmas, to inject an initial energetic plasma component with high magnetic orbital angular momentum and to produce highly transverse particle momenta to the magnetic field for electron or ion beam lithography.

14 Claims, 13 Drawing Sheets

(56) References Cited

U.S. PATENT DOCUMENTS

| | | | | |
|---|---|---|---|---|
| 4,596,946 | A * | 6/1986 | Pottier | H05H 9/04 315/5.52 |
| 5,225,146 | A * | 7/1993 | Ono | G21B 1/057 376/129 |
| 6,060,833 | A * | 5/2000 | Velazco | H05H 7/18 315/505 |
| 6,850,011 | B2 | 2/2005 | Monkhorst et al. | |
| 7,294,969 | B2 | 11/2007 | Kuninaka | |
| 7,295,494 | B2 | 11/2007 | Meier | |
| 7,488,960 | B2 | 2/2009 | Zani et al. | |
| 7,880,146 | B2 | 2/2011 | Johnstone | |
| 8,031,824 | B2 | 10/2011 | Bystriskii et al. | |
| 10,946,219 | B2 * | 3/2021 | Tahar | A61N 5/1077 |
| 12,028,960 | B2 * | 7/2024 | Ebrahimi | H01F 6/06 |
| 2005/0035731 | A1 * | 2/2005 | Secheresse | H05H 1/54 315/506 |
| 2007/0176699 | A1 * | 8/2007 | Lida | H05H 13/00 331/79 |
| 2019/0070438 | A1 * | 3/2019 | Tahar | H05H 13/085 |
| 2019/0094069 | A1 * | 3/2019 | Xu | H05B 47/11 |
| 2019/0239334 | A1 * | 8/2019 | Aoki | H05H 15/00 |
| 2022/0104338 | A1 * | 3/2022 | Ebrahimi | G21B 1/11 |
| 2024/0268013 | A1 * | 8/2024 | Ebrahimi | F03H 1/0081 |
| 2025/0081325 | A1 * | 3/2025 | Tully | H05H 1/54 |

FOREIGN PATENT DOCUMENTS

| | | | | |
|---|---|---|---|---|
| EP | 4346338 | A1 * | 4/2024 | H05H 13/085 |
| EP | 4383955 | A1 * | 6/2024 | H05H 13/00 |
| JP | 2010243501 | A * | 10/2010 | H05H 1/02 |
| JP | 2010277942 | A * | 12/2010 | H05H 7/22 |

OTHER PUBLICATIONS

Lee, "Pulse shaping of high-current electron beams with gradient B drift transport", osti.gov / Technical Report, N. pp. 1-2, 1986.

Vandas, "Acceleration of Electrons by a Nearly Perpendicular Shock: The Dynamics of Electron Motion", NASA/ADS, vol. 40, No. 3, pp. 189-195, 1989.

Bett, et al. "A design for an electromagnetic filter for precision energy measurements at the tritium endpoint" Progress in Particle and Nuclear Physics 106, pp. 120-131; Feb. 28, 2019.

Chung, et al. "Charged Particle Beam Injection into Magnetically Confined Plasmas"; In: Advances in Fusion Energy Research, Ed. by Bruno Carpentieri and Aamir Shahzad.; Rijeka: IntechOpen; Chap. 8. doi: 10.5772/intechopen.106037; (2022).

* cited by examiner

MAGNETIC ORBITAL ANGULAR MOMENTUM BEAM ACCELERATION

CROSS-REFERENCE TO RELATED APPLICATIONS

The present application claims priority to U.S. Provisional Pat. App. No. 63/228,463, filed Aug. 2, 2021, and is incorporated by reference herein in its entirety.

TECHNICAL FIELD

The present disclosure is drawn to devices, systems, and methods for creating and using particle beams.

BACKGROUND

Current particle beam heating techniques for magnetically confined plasmas rely on neutral beam injectors to allow external, neutral particles to enter the magnetically confined region. Neutral particles have zero magnetic orbital angular momentum and when they interact in the plasma, a large fraction of these particles after ionization have low magnetic orbital angular momenta and are not strongly confined.

Additionally, current particle beam lithography techniques use particles with large linear momentum to cut customized shapes on surfaces, such as nanostructured surfaces, but such techniques require a large linear momentum normal to the surface, which can negatively impact the structure of several layers below the surface layer.

BRIEF SUMMARY

To avoid these issues, a method and system for particle acceleration may be provided.

In some embodiments, a method for particle acceleration may be provided. The method may include providing particles in a zero or low magnetic field (i.e., a magnetic field whose strength is sufficiently low to allow for ballistic motion out of the source). The method may include causing the particles to be in cyclotron motion in a magnetic field that is strong compared to a momentum of the particles. The particles may have a gyroradius that is small compared to a transverse dimension of an injection aperture through which the particles will travel, where the magnetic field has a transverse gradient along an average path of the particles. The method may include utilizing a complementary electric field to balance a gradient-B drift transverse to the average path of the particles and accelerate the particles under work of the transverse gradient.

In some embodiments, the particles may include electrons, ions, or a combination thereof. In some embodiments, the method may include directing the particles towards a confined plasma. In some embodiments, the method may include directing the particles towards a substrate. In some embodiments, the substrate may be a semiconductor.

In some embodiments, a magnetic orbital angular momentum beam accelerator may be provided, e.g., from a source (such as an electron gun). The accelerator may include a tapered dipole magnet winding configured to have a magnetic field positioned to allow particles to enter the tapered dipole magnet winding, the magnetic field being a low magnetic field configured to cause the particles to begin cyclotron motion. The tapered dipole magnet winding may have a magnetic field gradient that is a transverse gradient along an average path expected of the particles. The accelerator may include a field cage. The field cage may include a plurality of electrodes, configured to form a complementary electric field to balance a gradient-B drift transverse to the average path of a beam of the particles and accelerate the particles under work of the magnetic field gradient.

In some embodiments, the field cage may be placed within a counter-dipole coil in an upper diagnostic port of a tokamak reactor. In some embodiments, the field cage may include, or be placed within, coils of a solenoid, custom superconducting dipole coils, iron pole-face magnets with shaped pole-faces, configurations of permanent magnets, or a combination thereof. In some embodiments, the accelerator may include an einzel lens configured to accelerate the particles from an initial magnetic field towards the tapered dipole magnet winding, the initial magnetic field being a zero or low magnetic field, the particles initially being low energy charged particles. In some embodiment, the particles may be reflected off a repelling electrode of the einzel lens into the tapered dipole magnet winding. In some embodiments, the particles include electrons, ions, or a combination thereof. In some embodiments, the particles may be accelerated in a low vacuum (i.e., a vacuum sufficiently low to allow unimpeded cyclotron motion). In some embodiments, the tapered dipole magnet winding may include superconducting magnets. In some embodiments, the tapered dipole magnet winding may be symmetrical around a plane extending through a central axis, each half of including a plurality of loops, each loop in the plurality of loops having a contoured rounded rectangular shape, each loop having one side that is substantially located at a first end, and where each loop has a different length.

DETAILED DESCRIPTION

Figure 1:
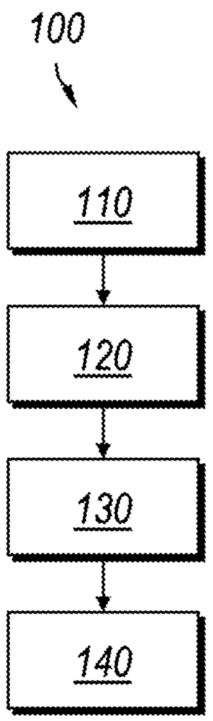
FIG. 1 is a flowchart of an embodiment of a method.

The present disclosure provides an improvement over existing particle beams, by delivering high energy particle heating through the kinetic energy of magnetically confined particles, or techniques for lithography that avoid the requirement for large linear momentum normal to the surface.

The dream of harnessing energy from controlled nuclear fusion has been proposed for several decades. Intensifying climate change issues increase the desire for a clean and safe energy source. A fusion reactor based on magnetic confinement provides a promising configuration for controlled thermonuclear fusion. To fuse nuclei with large densities for an extended period, it is necessary to heat the plasma to overcome the Coulomb repulsion. The power ratio, Q, of the fusion output power to the input power is proportional to the fusion product $nT\tau_E$, where n and T are the central ion density and temperature. The parameter $\tau_E$ is the energy confinement time. In December 2021, the Joint European Torus (JET) achieved a new record and produced 59 MJ of energy with a Q of 0.33 over a τE of 5 s. Although remarkable progress has been made to achieve the required n, T, and $\tau_E$, they have not been achieved in the same reactor configuration simultaneously.

To achieve an ignition condition where self-sustaining fusion is possible, additional energy-efficient heating is required. Ohmic heating from the toroidal current wanes at high temperatures. Two external sources are typically used to provide heating power, the resonant absorption of radio frequency electromagnetic waves and the injection of energetic neutral particle beams. The injected beams are neutralized to prevent reflection due to the magnetic field. The neutralization process introduces inefficiency and complicates the instrumentation.

Alternatives to neutral particle beam injection, typically for non-equilibrium fusion reactors, have been explored using different acceleration technologies. The challenges of energy efficiency in particle acceleration are formidable given the high fraction of input power needed to operate relatively low-Q fusion reactors. Radio-frequency acceleration cavities and time-varying electromagnetic fields are, in general, prone to internal ohmic losses and self-heating. Static accelerating fields avoid the bulk of these losses, but are suited primarily for charged particle beams. By construction, the insertion and extraction of charged particles from magnetic confinement systems is thwarted except when necessary, as in the case of divertors. However, non-confining trajectories can be constructed under special conditions through the same processes of cyclotron orbit drift that plague steady-state operation.

In the transverse drift electromagnetic filter developed for the Princeton Tritium Observatory for Light, Early-Universe, Massive-Neutrino Yield (PTOLEMY) experiment, a compact configuration of electromagnetic fields simultaneously transports and decelerates energetic electrons from the tritium f-decay endpoint starting in high magnetic fields of several Tesla to regions where both the kinetic energy and magnetic fields are reduced by several orders of magnitude.

The disclosed approach accelerates low-energy charged particles into a high magnetic field region by, conceptually, operating the PTOLEMY filter in "reverse."

In some embodiments, a method for particle acceleration may be provided. Referring to FIG. 1, in some embodiments, the method 100 may include providing 110 particles in a zero or low magnetic field. As used herein, the term "low magnetic field" refers to a magnetic field whose strength is sufficiently low to allow for ballistic motion out of the source of the particles. In some embodiments, this may include magnetic fields having a magnetic field strength of 1 T or less. In some embodiments, the magnetic field may have a strength of 0.75 T or less. In some embodiments, the magnetic field may have a strength of 0.5 T or less. In some embodiments, the magnetic field may have a strength of 0.25 T or less.

The low magnetic field transition into the accelerator should be a non-adiabatic transition that changes the bending radius of the particle trajectory within a single cyclotron orbit. This allows one to set the initial value of the magnetic moment for the injected particles.

In some embodiments, the particles may include electrons, ions, or a combination thereof. In some embodiments, particles are electrons provided from an electron gun. In some embodiments, the particles are deuterium. In some embodiments, the deuterium is a deuteron beam extracted from a cyclotron.

The method may include causing 120 the particles to be in cyclotron motion in a magnetic field that is strong compared to a momentum of the particles. The particles may have a gyroradius that is small compared to a transverse dimension of an injection aperture through which the particles will travel, where the magnetic field has a transverse gradient along an average path of the particles.

The method may include utilizing 130 a complementary electric field to balance a gradient-B drift transverse to the average path of the particles and accelerate the particles under work of the transverse gradient.

Referring to FIG. 1, In some embodiments, the method may include directing 140 the particles towards a target. In some embodiments, the target is a confined plasma. In some embodiments, the target is a substrate. In some embodiments, the substrate may be a semiconductor.

EXAMPLE

Basics of Charged Particle Beam Injection

As described herein, the convention used is that non-bolded symbols of vector quantities refer to the total magnitude unless a component is specified. The equation of motion of a charged particle of mass m and charge q in a magnetic field B is given by $$\frac{d}{dt}\left(m\frac{dr}{dt}\right) = q\frac{dr}{dt} \times B. \quad (1)$$

The Lorentz force on the right-hand side is perpendicular to the particle's velocity. In a uniform magnetic field, the particle's motion projected on a plane perpendicular to the magnetic field is circular, with a gyroradius given by $$\rho = \frac{mv_\perp}{qB} = \frac{\sqrt{2mT_\perp}}{qB}. \quad (2)$$

For a 1 MeV deuterium ion in a 5 T magnetic field, the gyroradius is about 0.04 m, a small fraction of a typical reactor radius. The ion beam injection energies must be relativistic to be commensurate with the reactor radius.

Relativistic ion beam injection introduces a number of inefficiencies. The plasma does not have the density required to stop energetic ions in a single transit, delivering limited power to the plasma and creating destructive irradiation of the reactor walls. The acceleration methods for relativistic beams involve time-varying fields that have several sources of intrinsic power loss.

Magnetic Orbital Angular Momentum Beam Acceleration

Here, charged particle injection of non-relativistic ions is re-examined as a transport mechanism that drifts charged ions from outside of the reactor volume to the surface of a target (such as the plasma in tokamak reactors, etc.)

An alternative method to inject a charged particle beam is to create a beam of particles whose gyroradius is small compared to the transverse dimensions of the injection aperture. The particles are in cyclotron motion in a magnetic field that is relatively strong compared to their momentum. The acceleration mechanism stems from the ability of particles traveling in cyclotron motion in magnetic field gradients to do work. One, therefore, configures a magnetic geometry such that there is a transverse gradient along the average path of the beam.

A complementary electric field is used to balance the gradient-B drift transverse to the average path of the beam and to accelerate the particles under the work of the magnetic field gradient. The acceleration process will be shown to be adiabatic for relevant injection energies and to maintain the magnetic moment invariance to a good accuracy after an initial stage of zero field ion source injection. The acceleration process does not affect the average linear momentum component of the beam. The increase in the charged particle kinetic energy follows from an increase in the magnetic orbital angular momentum.

Guiding-Center Drifts in Adiabatic Field Conditions

When a charged particle gyrates in a magnetic field with a transverse gradient, the cyclotron-orbit averaged Guiding Center System (GCS) motion can be described in terms of the drift terms of the virtual guiding-center particle if the spatial and temporal field variations within a single cyclotron orbit are taken to be adiabatic, i.e., $$\rho_c \ll \left|\frac{B}{\nabla B}\right|, \left|\frac{E}{\nabla E}\right|; \text{ and} \tag{3}$$

$$\tau_c \ll \left|\frac{B}{\mathrm{d}B/dt}\right|, \left|\frac{E}{dE/dt}\right|; \tag{4}$$

where $\rho_c$ is the Larmor radius and $\tau_c$ the cyclotron period. Under the conditions specified by eqs. (3) and (4), the first adiabatic invariant $\mu$, $$\mu = \frac{p_\perp^2}{2mB} = \frac{T_\perp}{B}, \tag{5}$$

accurately describes an invariant quantity preserved in the motion of the particle and shows that an increase in the magnetic field magnitude is accompanied by a proportional increase in the transverse kinetic energy. Additionally, the deviation of the GCS trajectory from the direction of the magnetic field lines can be described in terms of four fundamental drift terms, $$V_D = V_\perp = \left(qE + F - \mu\nabla B - m\frac{dV}{dt}\right) \times \frac{B}{qB^2}, \tag{6}$$

where $V_\perp$ is the perpendicular component of the GCS velocity with respect to the magnetic field line. The transverse drift velocity, $V_D$, is composed of individual terms, as appear in equation (6) from left to right, known as (1) the E×B drift; (2) the external force drift; (3) the gradient-B drift; and (4) the inertial drift.

It is possible to configure the electric and magnetic field parameters to manipulate certain drift terms to produce a net linear trajectory in the transverse direction.

Drifts and Work

The gradient-B drift is able to drive a charged particle up or down an electrostatic potential. This ability to do work, at first, seems contrary to the notion that magnetic fields do not do work on charged particles, as seen in equation 1, from the cross-product. Similarly, under the motion of E×B drift alone, the cross-product bars work as the electrons will drift on surfaces of constant voltage. This can also be understood by considering that it is always possible to boost into a frame in which the E×B drift is zero.

In contrast, a gradient-B drift due to a spatially varying magnetic field implies a time-varying electric field that cannot be boosted to zero. By itself, i.e., with a magnetic field and no electric field, a gradient-B does no work because there is nothing to do work against. However, when accompanied by an external E×B drift, the external electric potential provides a surface against which the gradient-B drift can do work on. The internal rotational kinetic energy of gyromotion of the virtual guiding-center particle is reduced for a corresponding increase in voltage potential. This is described by inserting terms from equation (6), $$\frac{dT_\perp}{dt} = -qE \cdot V_D = -qE \cdot (qE - \mu\nabla B) \times \frac{B}{qB^2} = \frac{\mu}{B^2} E \cdot (\nabla B \times B) \tag{7}$$

where $T_\perp$ is the internal kinetic energy of gyromotion in the GCS frame.

Balanced Drift

To produce a filter or accelerator based on the drift terms in equation (6), the external force and inertial drift terms are first taken to be zero, leaving only the electric and gradient-B drifts to be configured such that the total net drift is along a straight line parallel to the direction of the magnetic field gradient. The gradient-B drift alone is orthogonal to the direction of the magnetic field gradient, so the first step is to create a component of the E×B drift that exactly counters the gradient-B drift. From equation (6) this specifies the requirement, $$qE_{\|} \times B = \mu\nabla B \times B, \tag{8}$$

where $E_{\|}$ is the component of electric field parallel to the magnetic field gradient. In general, the ratio of the parallel electric field to the magnitude of the magnetic field to meet this condition depends on the ratio $\mu/q$ times the fractional rate of change of the transverse component of the magnetic field along the direction of the magnetic field gradient. For an exponentially falling transverse field, the fractional rate of change is $1/\lambda$, the characteristic exponential length scale in units of transverse distance.

To introduce work, the electric field is tilted by adding an additional component, $E_\perp$, that is orthogonal to the direction of the magnetic field gradient. The $E_\perp \times B$ drift is what moves the charged particle either against or along the magnetic field gradient. As the components of $E_\parallel$ and $E_\perp$ are in vacuum, the relationship between the components follows from solving Maxwell's equations for a set of voltage plates above and below the direction of balanced drift. Explicit solutions have been found (see Betti et al., "A design for an electromagnetic filter for precision energy measurements at the tritium endpoint.", Progress in Particle and Nuclear Physics. 2019; 106:120-31, the contents of which are incorporated herein in their entirety).

Given that the magnitudes of $E_\parallel$ and $E_\perp$ are related, it is not surprising that the net drift velocity along the acceleration direction is constant. There is no linear momentum acceleration present. The acceleration occurs through the increase in the transverse kinetic energy component, the magnetic orbital angular momentum, during a process of constant drift along the magnetic field gradient.

Because the orbital magnetic moment $\mu = T_\perp/B$ is invariant, if the B field increases (or decreases) exponentially along the trajectory of the particle, so must its transverse kinetic energy.

Figure 2A:
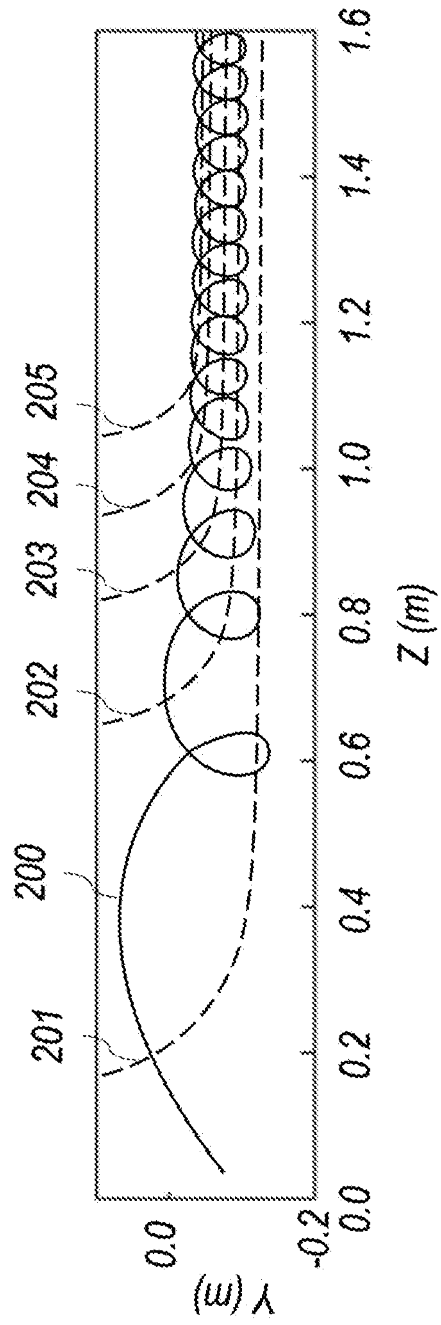
FIG. 2A is a graph showing a trajectory 200 of a deuterium ion in a balanced drift with an initial kinetic energy of 20 keV at 0.2 T going to 4.7 T region with 1 MeV final kinetic energy. Dashed lines indicate the gradient of energies, from about 0.2 MeV (210), about 0.4 MeV (220), about 0.6 MeV (230), about 0.8 MeV (240), to about 1.0 MeV (250).
Figure 2B:
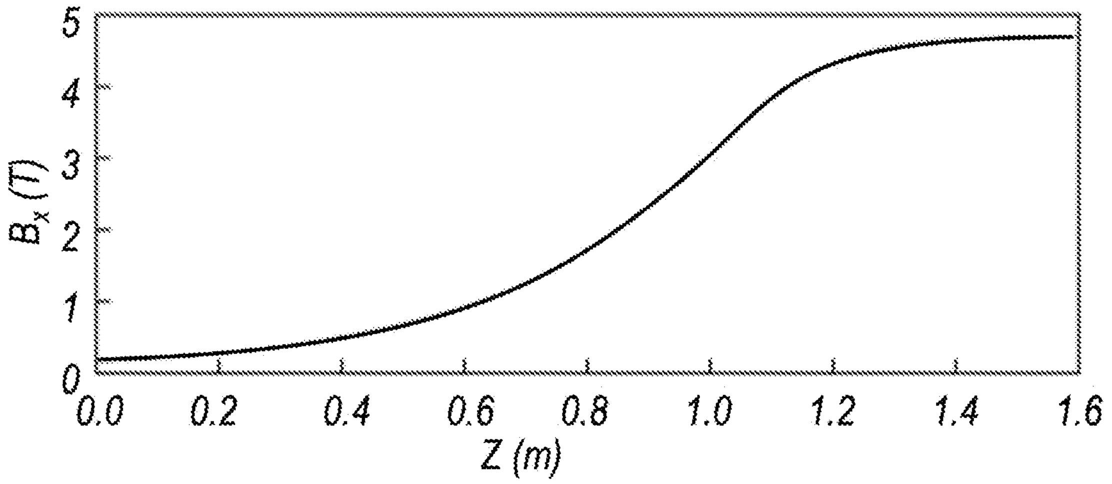
FIG. 2B is a graph showing the magnetic field used to generate the trajectory in FIG. 2, where the maximum of the $B_x$ field was set to 4.7 T at Z==1.6 m to match a toroidal field near an interface of an upper port of ITER.
Figure 2C:
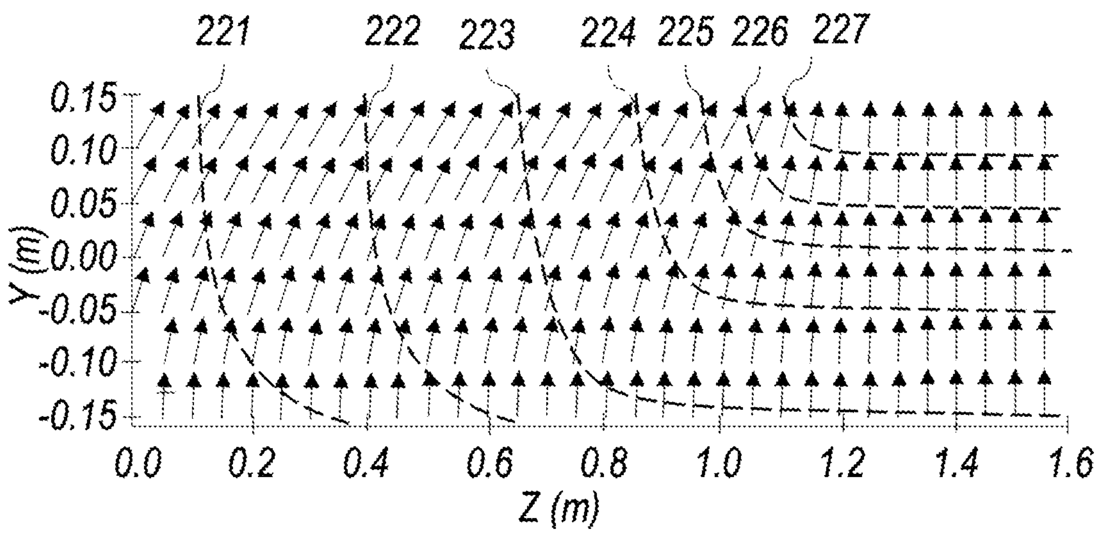
FIG. 2C is a graph showing the electric field generated by a transverse drift filter, where the dimensions are scaled such that the distance between electrodes is 0.3 m.

Referring to FIG. 2A, one can see the trajectory of a deuterium ion in a balanced drift with an initial kinetic energy of 20 keV at 0.2 T, going to a 4.7 T region with 1 MeV final kinetic energy. In this simulation, using CST studio, the magnetic field (see FIG. 2B) is scaled from the one produced by the PTOLEMY magnet. The maximum of the $B_X$ field is set to 4.7 T at Z=1.6 m to match the toroidal field near the interface of the upper port of ITER. The electric field as in FIG. 2C is generated by a similar electrode structure as in the PTOLEMY transverse drift filter. The dimensions are scaled up such that the distance between the electrodes is 0.3 m.

Injection

The net drift is along the direction of the magnetic field gradient and drives the guiding center of the beam to cross equipotential lines and accelerates the particles. When injecting into a tokamak, it can be seen that as the beam drifts in the direction of VB, it naturally reaches its maximum kinetic energy upon entering the toroidal magnet of a tokamak.

Charged Particle Beam Injection

Via the foregoing mechanism, initial simulations of injecting deuterium ions indicate successful delivery of the beam into a 1/R magnetic field in a tokamak using the accelerating structure of FIG. 1. Upon exiting the accelerator, the energetic ion continues to drift toward the plasma confinement region under the 1/R magnetic field gradient-B drift of the tokamak. Once the particle leaves the injection port, the gradient of the 1/R toroidal magnetic field drifts the ions into the center of the plasma. The relatively hot thermal temperature of the 1 MeV deuterium ions will thermalize through Coulomb interactions with the plasma. The injection mechanism supports a range of injection energies and ion species. For instance, injection of 4 MeV $\alpha$-particles through the ITER diagnostic port may be an effective way of studying the effects of fusion final-state ion interactions on the plasma. Charge neutralization can be achieved by instrumenting ion (electron) injection ports on the top (bottom) of the tokamak. The gradient-B drift will drift ions downward (for a given orientation of the azimuthal toroidal magnetic field) and electrons (or negative ions) upward.

Figure 3:
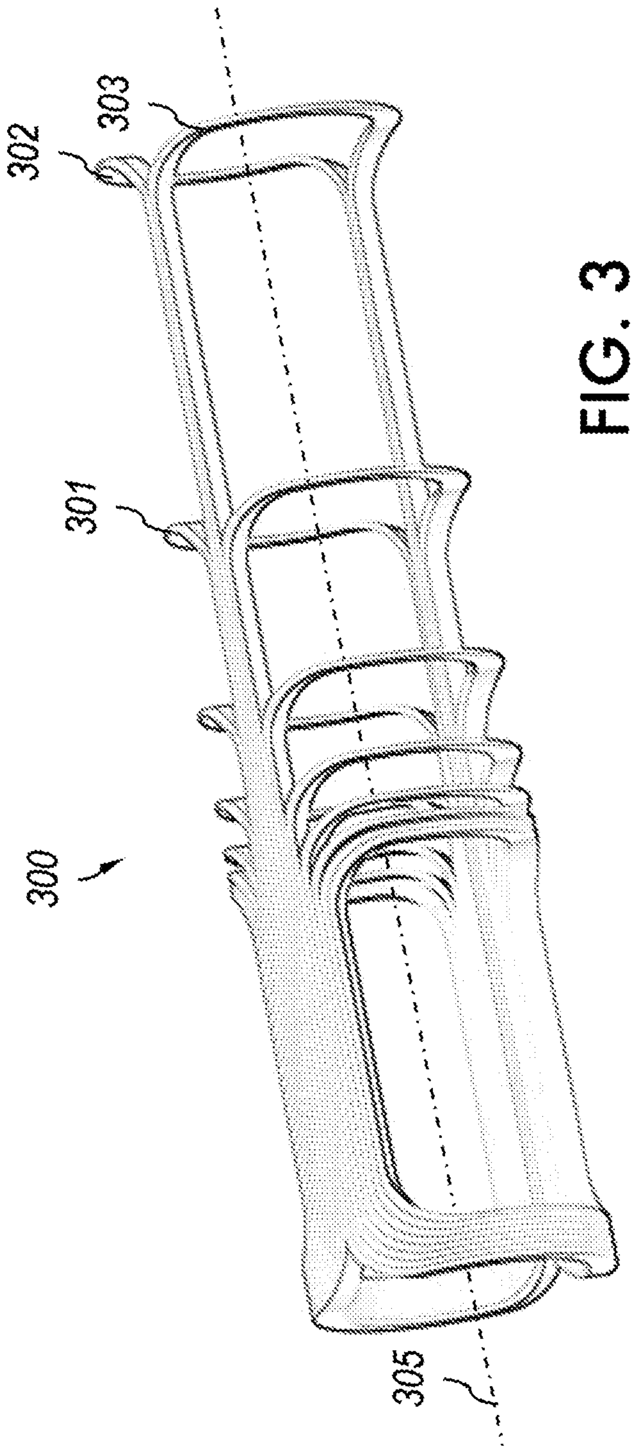
FIG. 3 is an illustration of a tapered dipole magnet winding.

Referring to FIG. 3, in some embodiments, the desired injection magnetic field can be produced by a tapered dipole magnet 300 with a superconductor winding 301, forming a plurality of loops 302, 303.

Figure 4:
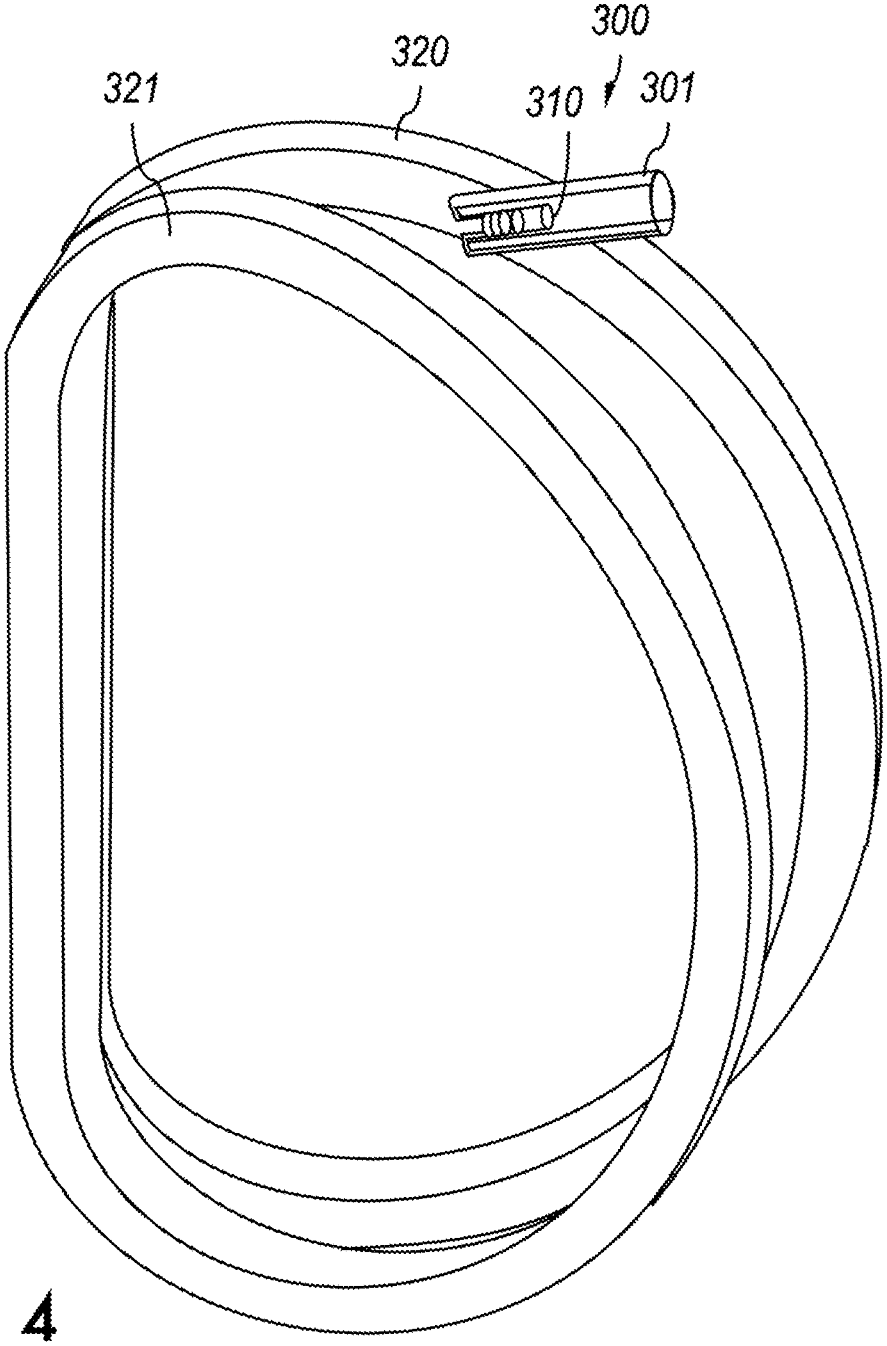
FIG. 4 is an illustration of a tapered dipole magnet winding positioned between two adjacent toroidal field coils.

Referring to FIG. 4, such a magnet is compact and can be placed within a counter-dipole winding placed in the upper port between two adjacent ITER toroidal field coils 320, 321. The counter-dipole reduces the magnetic forces between the injection system and the tokomak field windings. The counter-dipole creates a zero field region for the ion source and reduces Lorentz forces on the primary reactor coils. Note that a field cage 310 with a number of electrodes can be placed inside the magnet to produce the corresponding electric field.

In some embodiments, a magnetic orbital angular momentum beam accelerator may be provided.

Figure 5:
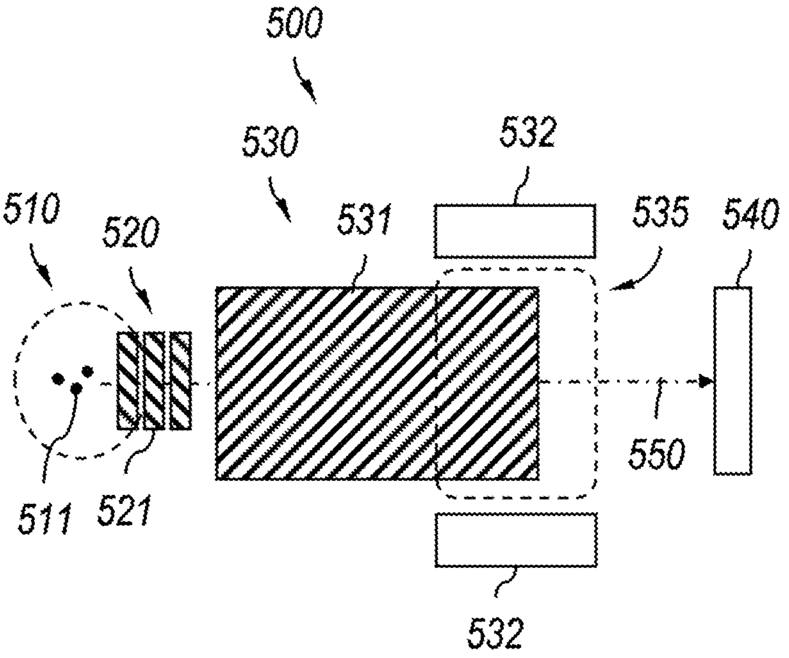
FIG. 5 is a simplified block diagram of a system.

Referring to FIG. 5, in some embodiments, the accelerator 500 may include an particles 511 in an initial magnetic field 510. The initial magnetic field may be a zero or low magnetic field. The particles may initially be low energy charged particles. In some embodiments, the particles include electrons, ions, or a combination thereof.

In some embodiments, the accelerator may include an einzel lens 520 configured to accelerate the particles from an initial magnetic field along a path 550 towards the injection mechanism 530 and eventually a target 540. In some embodiment, the particles may be reflected off a repelling electrode of the einzel lens into the injection mechanism 530, which may be, e.g., a tapered dipole magnet winding.

The injection mechanism 530 will generally include a plurality of electrodes 531 configured to form a desired electric field as disclosed herein, and at least one magnet 532 configured to form a desired magnetic field 535 as disclosed herein, where the electrodes 531 are at least partially within the magnetic field 535. In some embodiments, this may be accomplished with a tapered dipole magnet winding and a field cage, as appropriate.

The at least one magnet 532 (e.g., tapered dipole magnet winding) may be configured to have a magnetic field positioned to allow particles 511 to enter the injection mechanism, the magnetic field being a low magnetic field configured to cause the particles to begin cyclotron motion. The injection mechanism may have a magnetic field gradient that is a transverse gradient along an average path expected of the particles.

In some embodiments, the tapered dipole magnet winding may include superconducting magnets. In some embodiments, the tapered dipole magnet winding may be symmetrical around a plane extending through a central axis 305 (see FIG. 3), each half of including a plurality of loops, each loop in the plurality of loops defining a rounded rectangular shape contoured such that an inner surface of the loops define a volume of space having a circular, oval, or rounded rectangular cross-section, each loop having one side that is substantially located at a first end, and where each loop has a different length.

The plurality of electrodes may be configured as a field cage. The field cage may include a plurality of electrodes, configured to form a complementary electric field to balance a gradient-B drift transverse to the average path of a beam of the particles and accelerate the particles under work of the magnetic field gradient.

In some embodiments, at plurality of electrodes (e.g., field cage) may include, or be placed within, coils of a solenoid, custom superconducting dipole coils, iron pole-face magnets with shaped pole-faces, configurations of permanent magnets, or a combination thereof.

In some embodiments, the particles may be accelerated in a low vacuum. As used herein, low vacuum refers to a vacuum sufficiently low to allow unimpeded cyclotron motion. In the low vacuum, there will be beam losses from scattering as the vacuum increases. The tolerated level of vacuum may vary, and is typically set by the amount of acceptable beam loss per cyclotron orbit, where one would want to minimize beam losses. In some embodiments, this may be a pressure of 100 mbar or less. In some embodiments, this may be a pressure of 10 mbar or less. In some embodiments, this may be a pressure of 1 mbar or less.

Example

To better describe how the system operates, it may be helpful to understand how the magnet and transverse drift filter operate to drain a particle's transverse kinetic energy.

In previous work, it was found that it is possible for certain configurations of static, non-uniform electromagnetic fields to drive an electron up a potential hill while maintaining an overall trajectory that is straight on average in the transverse plane, and an electromagnetic filter was designed around this effect. The relevant drift terms are the E×B drift, which drives transport, and the non-electric gradient-B drift, which does work against the increasing potential along the trajectory. The gradient-B drift is proportional to $\nabla_{\perp}B/B=\lambda$; this term is the radius of curvature of the field lines. It is constant if B is an exponential in the transverse direction z with the decay parameter λ, i.e. $B \sim e^{-z/\lambda}$. The magnitude of E×B drift is proportional to E/B, so if E is also an exponential with the same X as B, then exact canceling is achieved between one of the E×B components and the gradient-B drift, and the other E×B components are also constant. The drift terms are calculated in the so-called Guiding Center System (GCS) frame of reference, i.e. the cyclotron orbit-averaged trajectory of the electron. The field changes are adiabatic relative to the motion of the trajectory.

The potential hill and E are produced by electrodes lined up along the trajectory. The precise geometry of the filter electrodes is described below. For B, it was found in that solutions to Maxwell's laws in the vacuum regions between flat coils of current-carrying wire, so-called pancake coils, could satisfy the field conditions above.

Here, an iron-core magnet design is introduced using high-permeability soft iron that is more practical than the pancake coils for an initial field magnitude of approximately 1 T. Following the equivalence of λ and the radius of curvature, one can look for patterns of magnetic field lines that have an apparently constant radius of curvature along one dimension. If such a pattern is observed, it follows from the uniqueness theorem that the field magnitude in that region must be decreasing exponential with a decay parameter λ equal to the radius of curvature of the field lines.

An iron pole-face gap magnet, such as a pair of counter-posed 'E'-shaped magnet cores, typically produces a region of uniform field in the air gap between the two poles. Extending transversely out from the air gap, the field decays roughly dipole in character, i.e. as $1/z^3$. This relation can be observed visually through the increasing radius of curvature of the field lines away from the gap, as all of the flux exiting one pole face must eventually return to the opposite pole face.

By introducing symmetric iron extensions to the side walls of such a magnet above and below the air gap, it is possible to turn the dipole-like field into a region of field with a constant radius of curvature.

Figure 6A:
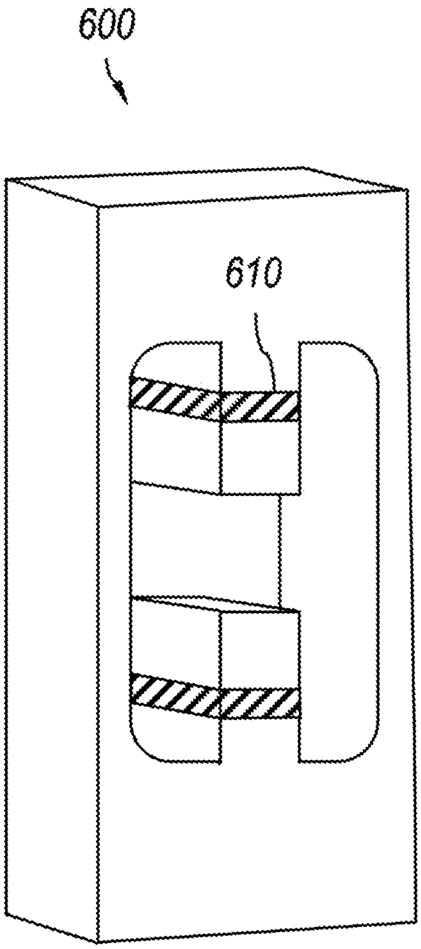
FIGS. 6A and 6B are illustrations of magnets.
Figure 6B:
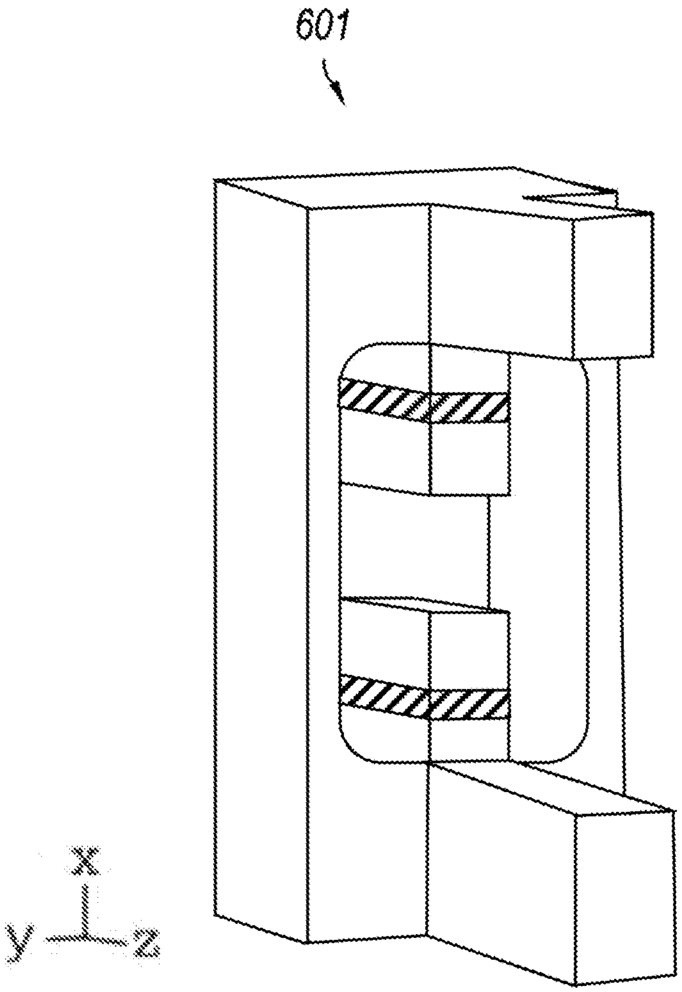

In FIGS. 6A and 6B, perspective views of a standard dual E-magnet (6A) and one with 32 cm extensions (6B) can be seen. The sections with diagonal slashes as current loops 610.

The effect of the extensions, modeled in FIG. 6B as rectangular bars, is to divert some of the flux away from the return yokes and back into the vacuum above and below the transverse plane to be recycled into the air gap. The resulting flux pressure constrains the expansion of the original flux radius, and with the right extension length, a channel of field lines with apparently constant radius of curvature can be created. The effect is minimal if the horns are too short; if the extensions are too long or approach each other too closely, a flux loop between them is closed and a quadrupole point is formed in the center region where the field goes to zero and switches direction. When viewing the field lines from magnets with different length extensions (0, 25 cm, 32 cm, and 40 cm), it is clear that only 32 cm shows the desired region of approximately constant radius of curvature.

The extensions need not be rectangular and fine adjustments to the location of the quadrupole point and the variance of λ can be made by varying the shape. Such methods can be used in principle to achieve an arbitrary level of precision in λ; however, in practice, this is unnecessary as what is important is not that the field has a specific or exactly constant value of λ, but that the opposing drift components cancel out at each point in z along the trajectory of the electron. This can be accomplished regardless of small deviations in λ f the $e^{-z/\lambda}$ term of the drift components, which is used to set the voltages on the filter electrodes, is replaced by the sampled values from a precision magnetic field map of the magnet in use. Concretely, the $B_x$-component of the field is sampled along z then normalized to the nearly constant $B_x$ at the air gap z=0:

$$B_x(z)/B_x(z=0) \approx e^{-z/\lambda}. \quad (9)$$

Filter Geometry Parameters

Figure 7A:
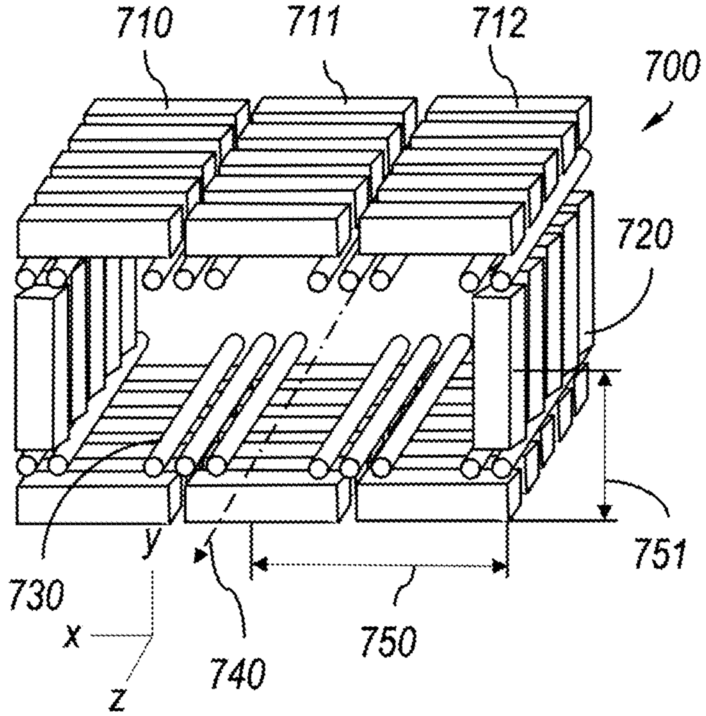
FIG. 7A is an illustration of a three-channel transverse drift filter.
Figure 7B:
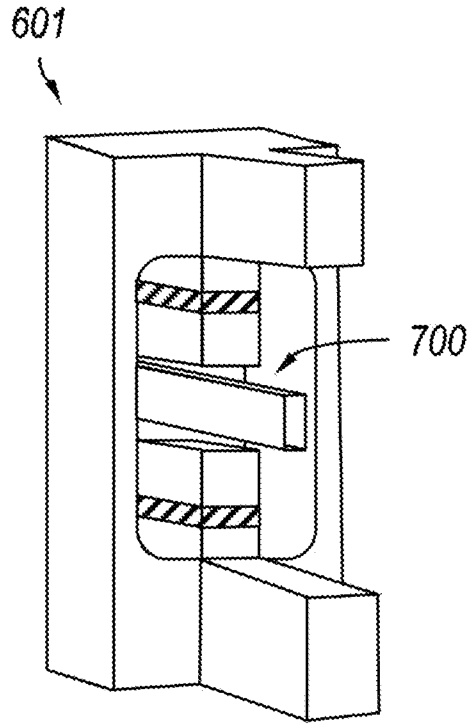
FIG. 7B is an illustration of a transverse drift filter in place in a magnet of FIG. 6B.

The filter geometry and coordinate system are shown in simplified FIG. 7A. The magnetic field and motion of the electron parallel to it is in x; the transverse plane is y–z. The electron enters the filter through the region of uniform field in the air gap and the overall transverse drift of the trajectory is in the +z-direction. The electrodes responsible for the E×B drift are referred to as the filter electrodes and are placed a distance $\pm y_0$ ($y_0$ is distance 751). from the center line (y=0) and span a length $2x_0$ in x ($x_0$ is distance 750). Placed at $\pm x_0$ are two long electrodes that extend the full length of the filter in z. These are referred to as the bounce electrodes; they close off the volume enclosed by the filter electrodes and contain the electron within the filter by reflecting the parallel momentum at each end.

Referring to FIG. 7A, a simplified illustration of a transverse drift filter can be seen. In FIG. 7A, the filter 700 can be seen to include electrodes and wires forming a hollow rectangular shell through which particles may travel. The centerline 740 is the nominal GCS trajectory of the particles passing through the shell (here, a path aligned with the z-axis in the +z direction).

The filter may include a plurality of filter electrodes 710, 711, 712. The filter electrodes may be aligned in three groups—a central group of electrodes 711, and two side groups 710, 712. Each group may form a "well" or "channel". The filter electrodes will generally form two sides of the rectangular shell; in FIG. 7A, they are aligned parallel to the x-z plane, at distances of ±y. In some embodiments, the negative-y electrodes may all be at a constant voltage, while the positive-y electrodes may vary in voltage.

The filter may include a plurality of bounce electrodes 720. The bounce electrodes will generally form the other two sides of the rectangular shell; in FIG. 7A, they are aligned parallel to the y-z plane, at distances of x.

The filter may include a plurality of field wires 730.

The parameters $x_0$ (distance 750) and $y_0$ (distance 751) are largely determined by the dimensions of the air gap of the magnet. A small aspect ratio $y_0/x_0$ is favorable to maintain field uniformity inside the filter. Nonetheless, $y_0$ should be large enough to accommodate the final cyclotron radius $\rho_c(z)$ of the electron as it grows with decreasing B(z). The value of $x_0$ is best if maximized as close to the size of the air gap as possible; since the arch of the field lines is bookended by the two pole faces, it turns out $x_0 \approx \lambda$. In some embodiments, a λ of 5 cm was used. In some embodiments, the air gap is 12 cm with λ≈6 cm. In some embodiments, $x_0$=5 cm.

To minimize $y_0$, one needs the cyclotron radius $\rho_c$ as a function of z, $$\rho_c(z) = \frac{\sqrt{2m(T_\perp(z))}}{|q|B(z)} \tag{10}$$

where q is the charge of the electron, $T_\perp(z)=\mu B(z)$ the transverse kinetic energy of the electron in the GCS frame, and μ the orbital magnetic moment of the electron. In terms of $B_0$, the initial field magnitude in the uniform region, and the initial cyclotron radius, $\rho_0=\rho_c(z=0)$, $$\rho_c(z) = \rho_0\sqrt{B_0/B(z)} \tag{11}$$

$$= \rho_0\sqrt{e^{z/\lambda}} \tag{12}$$

where in the last equality we use the approximation $B(z)=B_0e^{-z/\lambda}$. For an electron with initial $T_\perp$=18.6 keV and $B_0$=1 T, the initial radius is $\rho_0\approx$0.45 mm. With λ=6 cm this becomes approximately 1.25 cm at z=40 cm, corresponding to a final kinetic energy of ≈20 eV or three orders of magnitude reduction (when configured to reduce kinetic energy). To accommodate a final radius of 1.25 cm one can choose $y_0$=1.5 cm, which yields an aspect ratio $y_0/x_0$=0.3. At ratios larger than this, the field uniformity inside the filter degrades rapidly.

The ability to accommodate the growth of the cyclotron radius while maintaining field-uniformity for drift balancing is the biggest challenge against further reduction in $T_\perp$. One possibility to extend filter performance is to introduce a more elaborate filter geometry in which the aspect ratio $y_0/x_0$ is kept small while the overall dimensions increase with the radius. In general, though, the additional field gradients that come with an expanding or varying geometry make this procedure complex. A more efficient way to increase filter performance is to leave the geometry intact and increase the initial B.

The filter power increases as $B^2$ in that a factor of three increase in B results in a factor of nine decrease in the final kinetic energy. The cyclotron radius goes as 1/B while the energy, for a fixed radius, goes as $$\rho_c^2.$$

If the filter dimensions are unchanged and the starting field is increased to 3 T, the same radius 1.25 cm is achieved at z≈53 cm, corresponding to a final kinetic energy of ≈2 eV or four orders of magnitude reduction. The same principle of using iron extensions to redirect flux can be implemented with superconducting coils in place of an iron core to produce the necessary field.

Voltage Setting Optimization

A net y-drift of zero along the central line is achieved if the potential along the central line (x=y=0) satisfies $$\begin{aligned}\phi(z)|_{x,y=0} &= \phi_0 - \frac{\mu B_0}{|q|}\left(1 - e^{-z/\lambda}\right) \\ &= \phi_0 - T_\perp + T_\perp e^{-z/\lambda}\end{aligned} \tag{13, 14}$$

where $\phi_0$ is the initial potential at z=0 and Ti the initial transverse kinetic energy in eV. To turn this into voltages for the filter electrodes, we begin with the simplifying assumption that the potential at z is just the average between the two filter electrode voltages at that z, i.e., $\phi(z)|_{x,y=0}=[V_{y+}(z)+V_{y-}(z)]/2$, where $V_{y+}(z)$, $V_{y-}(z)$ are the voltages on the positive- and negative-y side electrodes. The accuracy of this approximation increases as the aspect ratio $y_0/x_0$ decreases.

All of the negative-y electrodes are set at a constant voltage which determines the total kinetic energy drained and only the positive-y electrode voltages vary along z, $$\begin{aligned}V_{y-}(z) &= \phi_0 - \frac{\mu B_0}{|q|} \\ &= \phi_0 - T_\perp \\ V_{y+}(z) &= \phi_0 + \frac{\mu B_0}{|q|}\left(2e^{-z/\lambda} - 1\right) \\ &= \phi_0 - T_\perp + 2T_\perp e^{-z/\lambda}\end{aligned} \tag{15, 16, 17, 18}$$

This is a schematic equation for the filter electrode voltages; as noted in the previous section, the $e^{-z/\lambda}$ term is substituted for by the normalized sampled $B_x$-component along the center line when the filter voltages are actually set.

Unlike previous analytical conditions, the non-zero aspect ratio of the filter and the transition region from uniform to decaying field may require corrections to the above voltages until precise drift balancing is achieved. Drift balancing can be calculated explicitly with the precision magnetic field map. The gradient-B drift is $$V_{\nabla B}(z)|_{x,y=0} = -\frac{\mu \times \nabla_\perp B(z)}{qB(z)} \tag{19}$$

where μ is invariant under the adiabatic field conditions of the filter. Along the center line, the $B_y$ and $B_z$ components are nearly zero and therefore the magnitude $B(z)\approx B_x(z)$, and the transverse gradient $\nabla_\perp B(z)\approx dB_x/dz$, leading to $$V_{\nabla B}(z)|_{x,y=0} = -\frac{\mu}{qB_z}\frac{dB_x}{dz}\hat{y} \tag{20}$$

The y-component of E×B drift that counteracts the gradient-B drift is $$V_{E\times B}^{y}(z)|_{x,y=0} = \frac{E_z \times B_x}{B_x^2}\frac{E_z}{B_z}\hat{y} \tag{21}$$

The sum of the two drifts should be zero; this is the drift balancing condition and yields an expression for $E_z$ that leads to the potential. If the voltages are used without correction, the actual net-drift that results is non-zero.

To correct the electrode voltages, one can take the difference between the observed potential and the calculated potential and add twice this difference to the voltages. Adding twice the difference is used because the adjustment is only made to the positive-y voltages. This procedure is repeated until a desired level of convergence with or desired level of filter performance is achieved. Explicitly, the voltages for the ith iteration, $V_{y+}[i]$, are set by $$V_{y+}[i] = V_{y+}[i-1] + 2(\phi_{ideal} - \phi[i-1]) \tag{22}$$

where $V_{y+}[i-1]$ and $\phi[i-1]$ are the voltages and potential from the previous iteration, and $\phi_{ideal}$ is the solution.

In some embodiments, the difference in filter performance for 1 T vs. 3 T starting magnetic field can be seen. The initial transverse kinetic energy of the electron is 18,600 eV. The final GCS transverse KE is 1.2 eV for 3 T and 9.3 eV for 1 T. The growth of the cyclotron radius of the electron as B decreases puts a ceiling on filter performance for a given $y_0$. The GCS trajectories are calculated from the instantaneous trajectories by averaging values over one cyclotron orbit. The beginning and end of a single cyclotron orbit is defined by intervals in which the instantaneous y and z velocities of the electron change sign twice in an alternating fashion, indicating circular motion.

For dimensions $y_0/x_0$=1.5/5 cm and a starting field of 3 T, the difference in #compared to the ideal and the net y-velocity along the center line for several rounds of iteration can be readily determined. When used to reduce kinetic energy, it is favorable to minimize the potential difference in the transition region z=0 to keep the electron from falling off the center line early on; the net y-drift is not in practice exactly zero but is nearly constant for the majority of the filter and can be counterbalanced by offsets in the starting y-position of the electron.

Boundary Value Method

An alternate method of solving for the filter electrode voltages based on a boundary-value method is presented here.

From (20) and (21), the voltage optimization is to find the voltage on the filter electrodes such that $$E_z = -\frac{\mu}{q}\frac{dB_x}{dz} \tag{23}$$

along x, y=0. Using the linearity of the Laplace equation, one can generate the $E_z^n$, $E_y^n$, $\phi^n$ for the nth electrode with boundary value $\{V^i\}$ where $$V^1 = \begin{cases} 1 & \text{if } i = n, \\ 0 & \text{if } i \neq n. \end{cases} \tag{24}$$

A least-square fitting was carried out to derive the parameters $c_n$ such that $$\sum_n c_n \cdot E_z^n = -\frac{\mu}{q}\frac{dB_x}{dz}. \tag{25}$$

Transverse Filter Speed

The speed at which the total kinetic energy of the electron is drained by the transverse drift filter depends on the z-component of the E×B drift, which is in the positive z-direction, $$V_{E\times B}^{y}(z)|_{x,y=0} = (1/B)\,\hat{y}\cdot\nabla V(y,z)|_{x,y=0} = \frac{E_y}{B_z}\hat{z}. \tag{26}$$

It is important that the magnitude of the z drift, which diverges as 1/B, not exceed the internal transverse velocity of the electron, $|v_\perp^*|$, until reaching the end of the filter. The GCS approximation assumes that the transverse drift is a fraction of the cyclotron velocity, giving prolate-shaped cycloid motion in the plane of the cyclotron motion. The transition to curtate-shaped cycloid motion occurs when the transverse drift velocity overtakes $|v_\perp^*|$, corresponding to an unraveling of the cyclotron motion in the filter frame of reference.

The divergence in z-velocity as B decreases to zero is mitigated if the $E_y$ component of the field goes to zero faster than $B_x$ does; one way to achieve this is to form a saddle point in the potential just before the quadrupole point, with the local maximum along x and the local minimum along z. The filter electrode voltages in this region can easily be manipulated to produce the saddle point; it also arises naturally in a three-channel filter geometry used to drain the parallel kinetic energy of the electron alongside the transverse.

Figure 8:
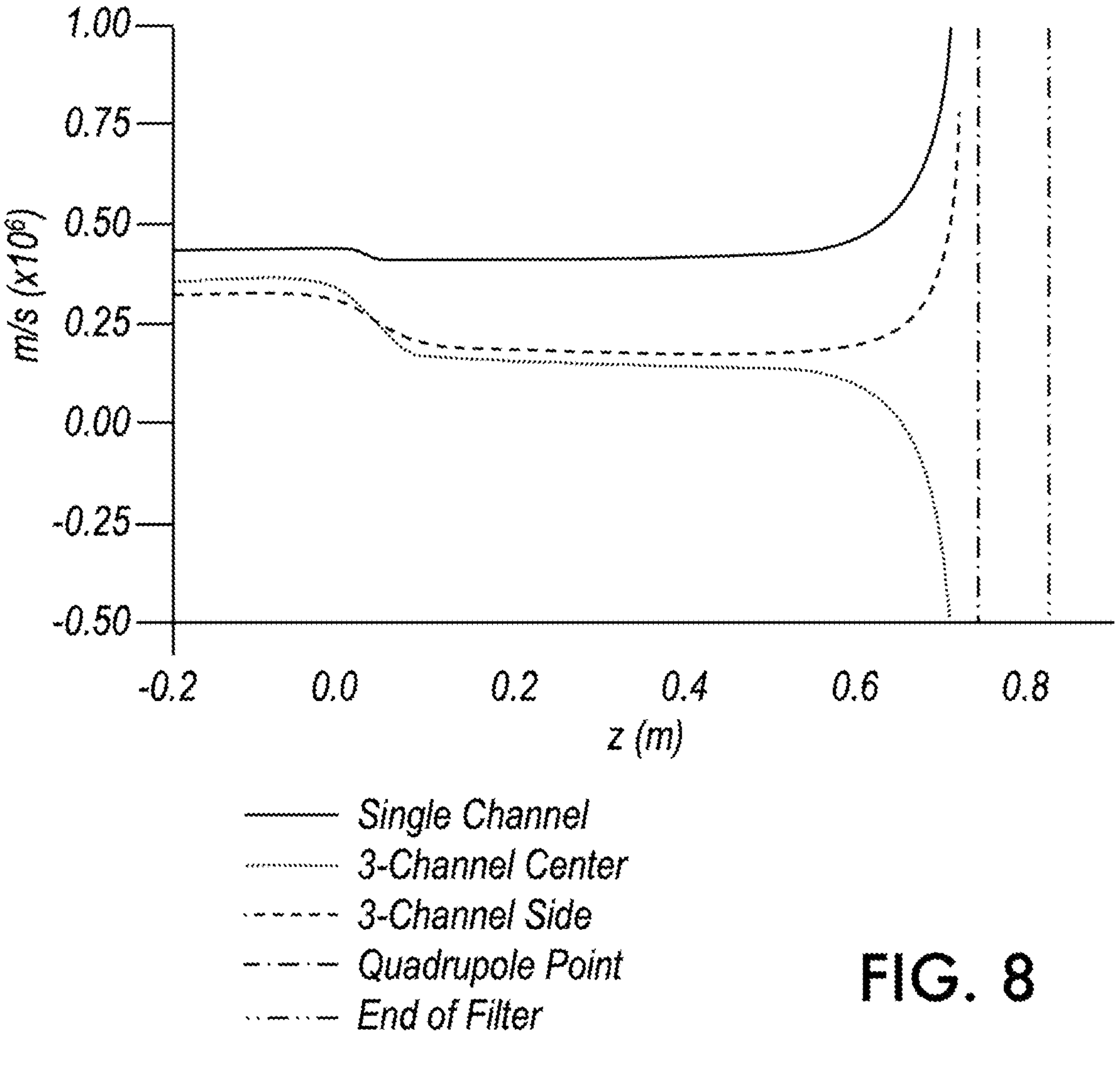
FIG. 8 is a graph showing net z-velocity along a centerline of the transverse drift filter.

Referring to FIG. 8, the net z-velocity along the center line can be seen for three different configurations (single channel, 3-channel center, and 3-channel side). The divergence in z-velocity as B approaches zero can be delayed by reducing the $E_y$ component of the field at the end of the filter.

Kinetic Energy Parallel to the Magnetic Field

The transverse drift filter was created with the primary goal of draining the transverse kinetic energy of a charged particle using gradient-B drift, and as disclosed above, the filter electrode voltages were calibrated under the assumption that all of the kinetic energy is transverse to the magnetic field. In practice the electron will also have a parallel component, and it is advantageous for successful operation of the filter for the parallel momentum to be sub-dominant to the transverse.

An electron with non-zero parallel kinetic energy inside the filter will undergo periodic 'bouncing' motion in x; the bounce electrodes reflect electrons back to the center of the filter with a restoring E·B term, which, in some embodiments, has been implemented as a harmonic potential.

In general, the motion of an electron inside the filter is continuous cyclotron motion with forward drift in z accompanied by bouncing motion in x. If the parallel component becomes the dominant part of the total kinetic energy, two important effects begin to manifest. The first is the non-adiabatic nature of the trajectory where less than a single cyclotron orbit is completed before the electron has completed a single bounce, i.e., traversed the full width of the filter. The second is the transverse drift known as curvature drift.

Curvature drift originates from the centripetal forces that result as a tendency of the cyclotron motion of charged particles to follow magnetic field lines. For an exponentially falling B field, the characteristic length λ and the radius of curvature are equal, $R_c=\lambda$, and $$\nabla_\perp B = -\frac{B}{R_c}\hat{n} \tag{27}$$

where n̂ is the unit vector normal to the magnetic field line curvature. In vacuum, the combined gradient-B and curvature drifts are given by $$V_{\nabla B-C} = \frac{1}{2}m\left(v_\perp^2 + 2v_\parallel^2\right)\frac{B\times\nabla_\perp B}{qB^3} = (T_\perp + 2T_\parallel)\frac{B\times\nabla_\perp B}{qB^3} \tag{28}$$

in the non-relativistic approximation. For an equal amount of kinetic energy, the curvature drift is apparently a factor of two greater than the gradient-B drift. Unlike the gradient-B drift however, which is constant along the filter owing to the first adiabatic invariant μ, the curvature drift depends on the instantaneous value of $$v_\parallel^2,$$

which is therefore rapidly averaged over successive bounces in the filter to have an effective bounced-averaged value $$\langle v_\parallel^2\rangle.$$

For a filter geometry symmetric in x the maximum value $$|v_\parallel^{max}|$$

is attained at x=0, and for a harmonic bounce potential along the B field direction, the average value of $$\langle v_\parallel^2\rangle = \left(v_\parallel^{max}\right)^2/2.$$

Plugging this back into (28), the factor of two relative to the gradient-B drift disappears.

Therefore, the total gradient-B and curvature transverse drift is proportional to the total kinetic energy T(z) of the electron at x=0 in the filter and points in the negative y-direction, $$V_{\nabla B-C} \sim \frac{T(z)}{B(z)R_c}\Big|_{x=0}\hat{y}. \tag{29}$$

Additionally, the component of transverse drift along the normal of the B field, i.e., along z, introduces an additional contribution to the curvature drift that scales as $$|v_\parallel V_{E\times B}^z|$$

rather than $$v_\parallel^2.$$

Therefore, at the end of the filter, the effects of curvature drift can be dramatic if $$V_{E\times B}^z$$

is a substantial fraction of $$|v_\perp^*|.$$

The $$V_{E\times B}^z$$

drift is mitigated by use of a saddle point, nonetheless it is advantageous to also drain the parallel energy faster relative to the transverse to avoid this runaway drift.

Bounce Electrodes, Field Wires and Side-Well Potentials

The parallel kinetic energy of an electron inside the filter can be drained by modifying the design into a three-channel geometry as follows. Consider an electron undergoing bounce motion in the filter. At the turning points of the motion, the parallel kinetic energy goes to zero while the transverse kinetic energy is largely unchanged. When the electron is reflected back towards the center of the filter by the bounce electrodes, the parallel kinetic energy returns to its maximum value at x=0. However, because the electron is also moving forward in z as the bounce occurs, the potential at x=0 upon return to the center is not the same as it was when it left; it has increased. In the GCS frame, since this increase in potential is along the direction of the bounce motion, and not in the transverse, the parallel kinetic energy is the one that is drained, in an amount nominally equal to the potential difference at x=0 before and after the bounce.

The same effect is observed in the original single-channel filter, but the parallel drain is small since the forward displacement in z between bounces is small. The amount of parallel drain can be increased if the electron is made to linger in the side region of the filter before returning to the center, increasing the forward displacement in z.

This can be achieved to good precision if the initial parallel kinetic energy of the electron is known. Referring to FIG. 7A, the interior of the filter may be split into three discrete potential wells; which can be referred to as center-wells (e.g., under "center" electrodes 711) and side-wells (e.g., under "side" electrodes 710 and 712). To the center potential, previously configured only for the transverse kinetic energy drain, is now added the parallel draining term so that the end of the filter remains the total energy drained. The side potential at z is increased (decreased, as it were, for an electron) by an amount equal to the parallel kinetic energy of the electron at z. Since the potential step between side-center-side is in the direction of parallel motion, when the electron enters the side-well from the center its parallel kinetic energy is reduced to nearly zero, thus causing it to linger there while undergoing transverse drain forward in z, before eventually bouncing back to the center as before, achieving the desired mechanism.

Explicitly, with $T_\perp$ and $T_\parallel$ the initial transverse and parallel kinetic energies, respectively, the idealized potentials are now, setting the reference offset $\phi_0=T_{total}$, $$\phi_{cent}(z)|_{y=0} = T_\perp e^{-z/\lambda_{cent}} + T_\parallel e^{-z/\lambda_{side}} \tag{30}$$

$$\phi_{side}(z)|_{y=0} = \phi_{cent}(z) - T_\parallel e^{-z/\lambda_{side}} = T_\perp e^{-z/\lambda_{cent}}, \tag{31}$$

where $\lambda_{side}$, which sets the rate of parallel energy drain, is not required to be the same as $\lambda_{cent}$. If $\lambda_{side}=\lambda_{cent}$, $$\phi_{cent}(z)|_{y=0} = T_{total} e^{-z/\lambda} \tag{32}$$

$$\phi_{side}(z)|_{y=0} = T_\perp e^{-z/\lambda}, \tag{33}$$

which makes clear that the center potential is the total energy drained and the side potential is just the potential for an electron with the same transverse kinetic energy but zero parallel component, i.e. transverse-only draining. The corresponding electrode voltages are $$V_{cent,y-}(z) = 0 \tag{34}$$

$$V_{cent,y+}(z) = 2T_{total} e^{-z/\lambda} = 2T_\perp e^{-z/\lambda_{cent}} + 2T_\parallel e^{-z/\lambda_{side}} \tag{35}$$

$$V_{side,y-}(z) = 0 - 2T_\parallel e^{-z/\lambda_{side}} \tag{36}$$

$$V_{side,y+}(z) = 2T_\perp e^{-z/\lambda_{cent}} + 2T_\parallel e^{-z/\lambda_{side}}. \tag{37}$$

In contrast to the center, the addition of the parallel energy term to the side voltages is split across the top and bottom electrodes rather than applied only to the top electrodes. The total potential difference across the top and bottom in the side well is also increased relative to the center in order to increase the Ey magnitude and therefore the forward drift in z to account for the slight backwards motion in z due to the curvature of the field lines.

Given (34)-(37), the voltages are iterated as before, with the correction term also split across top and bottom for the side voltages.

$$V_{cent,y-}[i] = 0 \tag{38}$$

$$V_{cent,y+}[i] = V_{cent,y+}[i-1] + 2(\phi_{ideal,cent} - \phi_{cent}[i-1]) \tag{39}$$

$$V_{side,y\pm}[i] = V_{side,y\pm}[i-1] + (\phi_{ideal,side} - \phi_{side}[i-1]) \tag{40}$$

Figure 9:
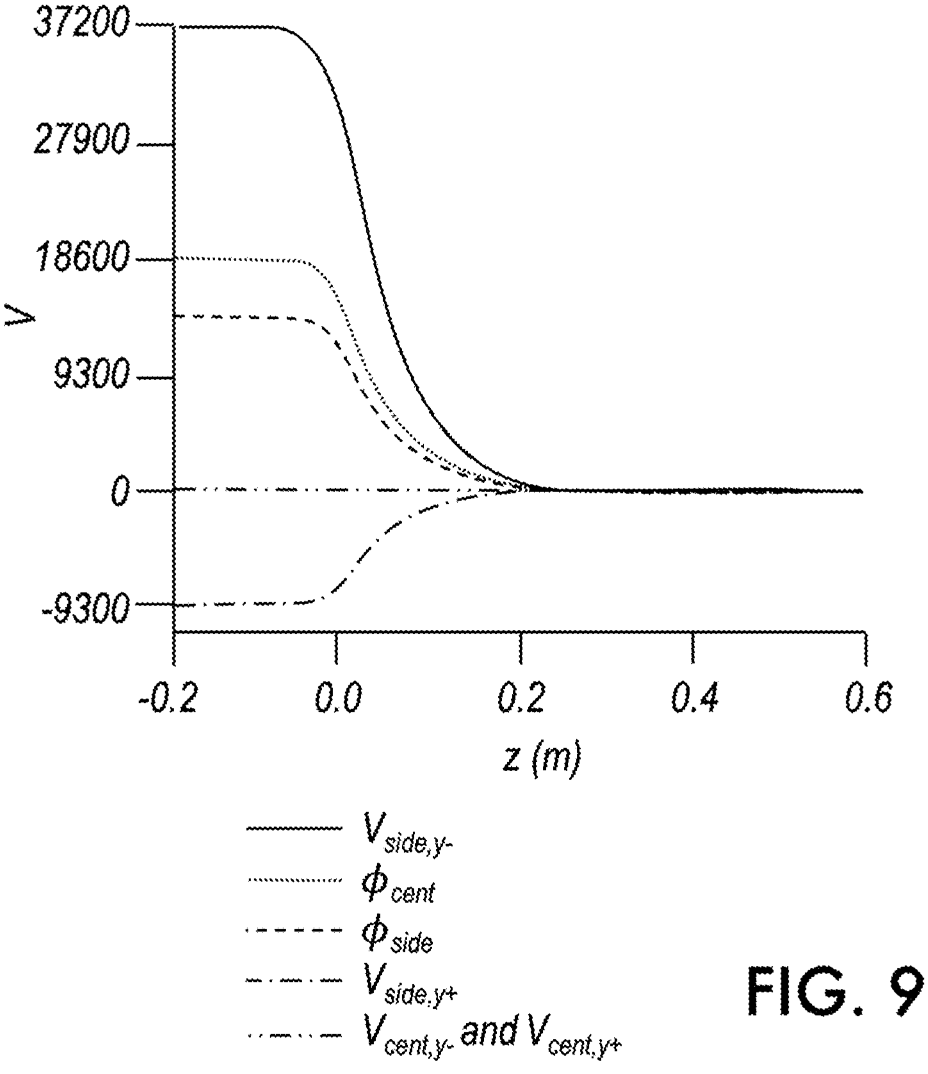
FIG. 9 is a graph showing filter electrode voltages and idealized potentials along the center line of the respective wells. Voltages are set for a pitch 60° electron with total kinetic energy 18.6 keV, with $\lambda_{side}=\lambda_{cent}$.

FIG. 9 shows filter electrode voltages and idealized potentials along the center line of the respective wells. Voltages are set for a pitch 60° electron with total kinetic energy 18.6 keV, with $\lambda_{side}=\lambda_{cent}$.

Finally, to increase the sharpness of the transition between the center and side wells, additional field wires are placed along the splits in the filter electrodes. To maintain maximum relative uniformity of the side and center potentials down the entire filter length z, both the field wires and bounce electrodes are segmented in z the same as the filter electrodes. The field wire voltages mirror the opposite side filter electrode voltages and the bounce electrodes, to ensure continuous bouncing but not so much so that the bounce potential contaminates the side and center potentials, are set with a fixed offset plus a decay term proportional to the initial parallel kinetic energy, $$V_{wires,y\pm}(z) = V_{cent/side,y\pm}(z) \tag{41}$$

$$V_{bounce}(z) = \phi_0 - V_{fixed} - \alpha T_\parallel e^{-z/\lambda}. \tag{42}$$

where $\alpha<1$.

Injection of Charged Particles with a Reversed Filter

Figure 10:
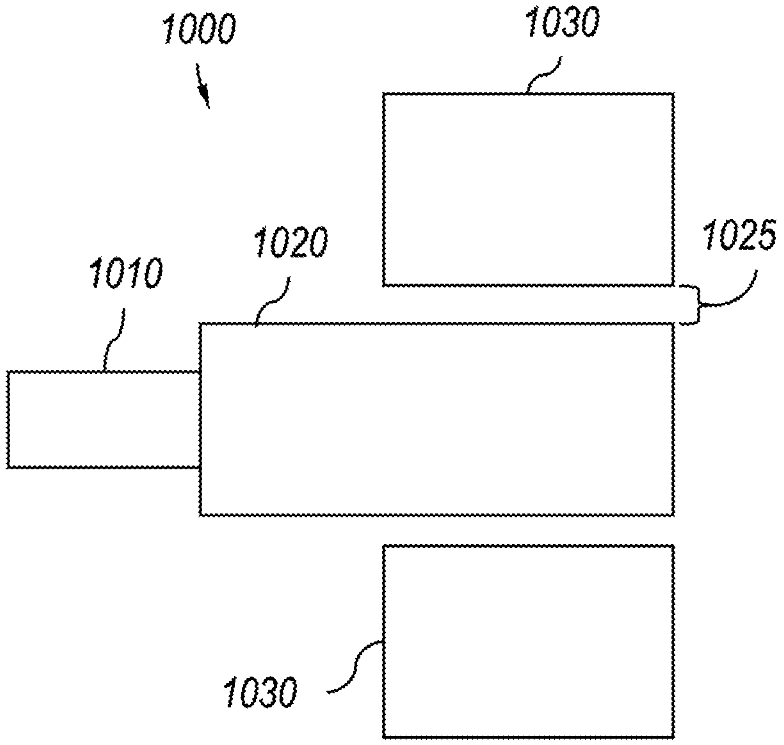
FIG. 10 is a cross-sectional view of a simplified system using a magnet and transverse drift filter.

One approach is to operate a filter in reverse. Referring to FIG. 10, a system 1000 can be seen. In the system, a source of particles 1010 (here, an electron gun) is configured to provide particles to an injection end of the filter 1020. Instead of decreasing kinetic energy, the filter is configured to increase kinetic energy. At least a part of the filter 1020 is within a magnetic field generated by the magnet 1030. In some embodiments, there may be a gap 1025 between the magnet and the filter. The injected electrons are accelerated by gradient-B drift using the same drift conditions as the draining process.

Figure 11A:
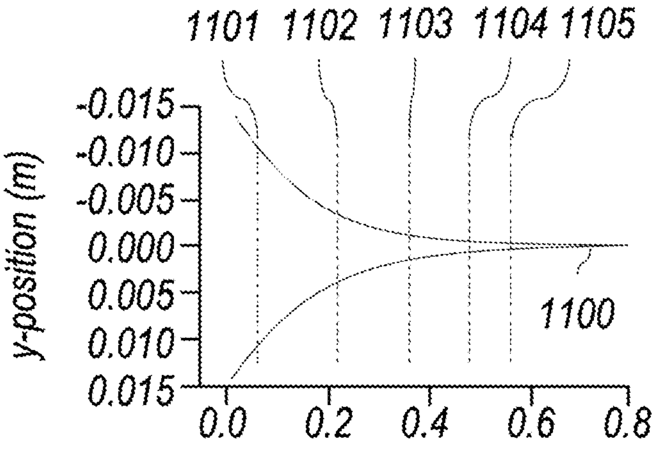
FIGS. 11A and 11B are graphs showing the y-position (11*a*) and transverse kinetic energy (11B) over the length of the filter can be seen for a pitch 90° electron in the "reverse" filter setup that is symmetric about z.
Figure 11B:
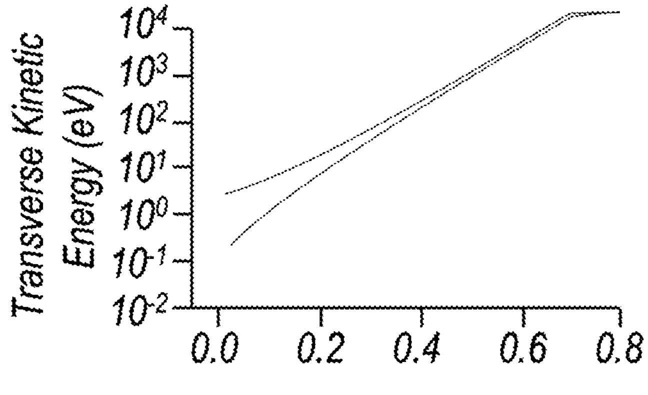

As seen in FIGS. 11A and 11B, the y-position and total kinetic energy (11A), and the transverse kinetic energy (11B) over the length of the filter can be seen. In FIG. 11A, the y-position 1100 can be seen having cyclical motion with ever-decreasing radius of movement as it proceeds down the filter. As that is occurring, the total kinetic energy is increase, from around 1 eV (1101) to 10 eV (1102), 100 eV (1103), 1 keV (1104), to over 10 keV (1105). An electron, starting at around 1 eV, is accelerated by gradient-B drift to around 18.6 keV at the end of the filter. As seen in FIG. 11B, the transverse kinetic energy over the length of the filter can be seen increasing to over 10 keV.

Figure 12:
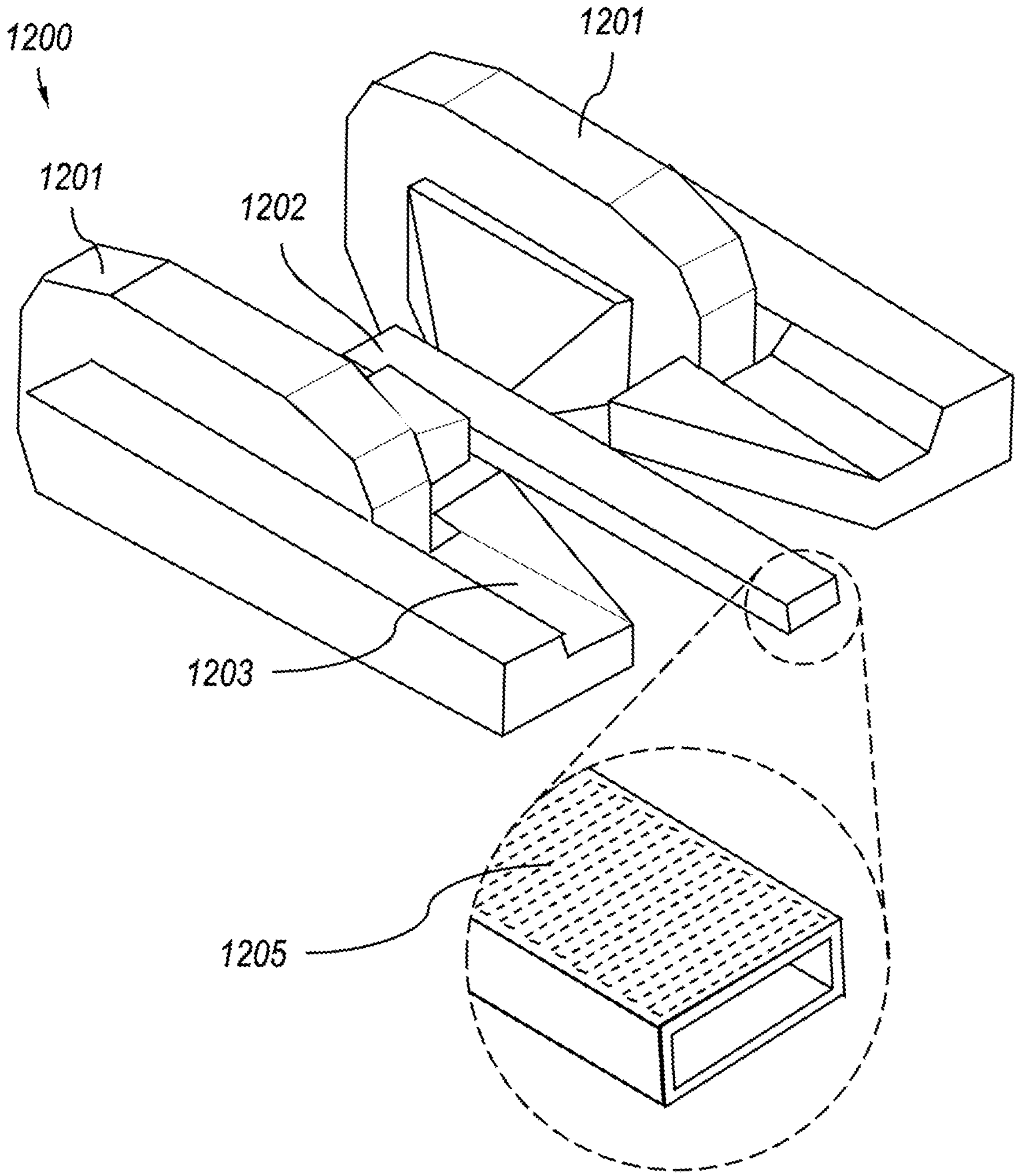
FIG. 12 is an illustration of a test system using magnets and a transverse drift filter.

As seen in FIG. 12, a system 1200 with a magnet having coils 1201 and iron extensions 1203, and a three-channel transverse drift filter 1202, with a plurality of filter electrodes 1205 can be seen.

The $B_x$ field was mapped out by digital 3-axis hall magnetic sensors. Initial investigation found good agreement between the measured fields and simulations. With new power supplies, the $B_x$ field may start at about 1 T between pole faces and fall exponential with λ~7 cm.

Tolerance Estimation

The filter electrodes 1205 have 80 individual voltages set over a distance of one meter along the z direction. Each electrode has a width of 6.25 mm and a separation gap of 6.25 mm between closest surfaces. According to the simulated B field, the voltage settings are computed using the foregoing boundary-value method.

The foregoing is merely illustrative of the principles of the disclosure, and the apparatuses can be practiced by other than the described embodiments, which are presented for purposes of illustration and not of limitation. It is to be understood that the apparatuses disclosed herein, while shown for use in plasma heating or particle etching, may be applied to apparatuses in other applications.

Variations and modifications will occur to those of skill in the art after reviewing this disclosure. The disclosed features may be implemented, in any combination and subcombination (including multiple dependent combinations and sub-combinations), with one or more other features described herein. The various features described or illustrated above, including any components thereof, may be combined or integrated in other systems. Moreover, certain features may be omitted or not implemented.

Examples of changes, substitutions, and alterations are ascertainable by one skilled in the art and could be made without departing from the scope of the information disclosed herein.

What is claimed:

1. A method for particle acceleration, comprising:

providing particles in a zero or low magnetic field;

causing the particles to be in cyclotron motion in a magnetic field that is strong compared to a momentum of the particles, the particles having a gyroradius that is small compared to a transverse dimension of an injection aperture through which the particles will travel, wherein the magnetic field has a transverse gradient along an average path of the particles; and utilizing a complementary electric field to balance a gradient-B drift that is transverse to an average path of the particles and accelerate the particles under work of the transverse gradient.

2. The method according to claim 1, wherein the particles comprise electrons, ions, or a combination thereof.

3. The method according to claim 1, further comprising directing the particles towards a confined plasma.

4. The method according to claim 1, further comprising directing the particles towards a substrate.

5. The method according to claim 4, wherein the substrate is a semiconductor.

6. A magnetic orbital angular momentum beam accelerator, comprising:

a tapered dipole magnet winding configured to have a magnetic field positioned to allow particles to enter the tapered dipole magnet winding, the magnetic field being a low magnetic field configured to cause the particles to begin cyclotron motion, and has a magnetic field gradient that is a transverse gradient along an average path expected of the particles; and a field cage comprising a plurality of electrodes, configured to form a complementary electric field to balance a gradient-B drift that is transverse to an average path of a beam of the particles and accelerate the particles under work of the magnetic field gradient.

7. The magnetic orbital angular momentum beam accelerator according to claim 6, wherein the field cage is placed within a counter-dipole coil in an upper diagnostic port of a tokamak reactor.

8. The magnetic orbital angular momentum beam accelerator according to claim 6, wherein the field cage includes, or is placed within, coils of a solenoid, custom superconducting dipole coils, iron pole-face magnets with shaped pole-faces, configurations of permanent magnets, or a combination thereof.

9. The magnetic orbital angular momentum beam accelerator according to claim 6, further comprising an einzel lens configured to accelerate the particles from an initial magnetic field towards the tapered dipole magnet winding, the initial magnetic field being a zero or low magnetic field.

10. The magnetic orbital angular momentum beam accelerator according to claim 9, wherein the particles are reflected off a repelling electrode of the einzel lens into the tapered dipole magnet winding.

11. The magnetic orbital angular momentum beam accelerator according to claim 6, wherein the particles comprise at least one of electrons and ions.

12. The magnetic orbital angular momentum beam accelerator according to claim 6, wherein the particles are accelerated in a low vacuum.

13. The magnetic orbital angular momentum beam accelerator according to claim 6, wherein the tapered dipole magnet winding comprises superconducting magnets.

14. The magnetic orbital angular momentum beam accelerator according to claim 6, wherein the tapered dipole magnet winding is symmetrical around a plane extending through a central axis, each half of including a plurality of loops, each loop in the plurality of loops having a contoured rounded rectangular shape, each loop having one side that is substantially located at a first end, and where each loop has a different length.

* * * * *